(12) United States Patent
Klotz et al.

(10) Patent No.: US 6,618,468 B2
(45) Date of Patent: Sep. 9, 2003

(54) METHOD OF RECONSTRUCTING IMAGES FROM X-RAY CONE BEAM PROJECTION DATA

(75) Inventors: Erhard Paul Artur Klotz, Neumeunster (DE); Reiner Koppe, Hamburg (DE); Hermann Schomberg, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/126,214

(22) Filed: Apr. 19, 2002

(65) Prior Publication Data

US 2002/0154737 A1 Oct. 24, 2002

(30) Foreign Application Priority Data

Apr. 19, 2001 (DE) .......................... 101 19 105

(51) Int. Cl.⁷ ................................ H05G 1/64
(52) U.S. Cl. .................... 378/98.12; 378/62
(58) Field of Search ................ 378/4, 62, 98, 378/98.12

(56) References Cited

U.S. PATENT DOCUMENTS 6,351,513 B1 * 2/2002 Bani-Hashemi et al. ....... 378/8
6,389,104 B1 * 5/2002 Bani-Hashemi et al. . 378/98.12

* cited by examiner

Primary Examiner—David V. Bruce
(74) Attorney, Agent, or Firm—Thomas M. Lundin

(57) ABSTRACT

The invention relates to a method of reconstructing images from cone beam projection data from an examination zone (3) of an object to be examined. The cone beam projection data is acquired by means of an X-ray device which includes an X-ray source (1) and an X-ray image intensifier (2), the X-ray source (1) being guided along a trajectory around the examination zone (3) in order to acquire the projection data. First projection data are then acquired from the examination zone (3) in a first mode of operation of the X-ray image intensifier (2) which involves a low resolution. For a sub-zone (4) of the examination zone (3) second projection data is acquired in a second mode of operation of the X-ray image intensifier (2) which involves a high resolution. Subsequently, the first and second projection data is combined so as to form third projection data. The third projection data is represented by the second projection data in the sub-zone (4) of the examination zone (3) and by the first projection data in the remaining part (3a) of the examination zone (3). The images are reconstructed on the basis of the third projection data. The invention also relates to a corresponding X-ray device, notably a C-arm X-ray device.

5 Claims, 1 Drawing Sheet

METHOD OF RECONSTRUCTING IMAGES FROM X-RAY CONE BEAM PROJECTION DATA

BACKGROUND

The invention relates to a method of reconstructing images from X-ray cone beam projection data, and also to a corresponding X-ray device.

It is known to use a C-arm X-ray system for imaging. First a set of X-ray cone beam projections is then acquired from an examination zone of an object to be examined. Subsequently, the two-dimensional or three-dimensional distribution of the X-ray attenuation coefficient within the examination zone to be imaged is reconstructed from such a set of cone beam projections. This distribution serves as a 2D image or 3D image of said examination zone.

The object to be examined is customarily a human body. The cone beam used for the projection is formed by a substantially punctiform X-ray source (the apex of the cone) and the sensitive surface area of the X-ray detector which can be reduced by switching over the electron-optical system. The examination zone to be imaged is then situated between the X-ray source and the detector. The X-ray source is attached to one end of the C-arm system and is guided along a predetermined trajectory around the examination zone to be imaged in order to acquire a set of cone beam projections. One cone beam projection after the other is measured at short intervals in time or space. Because of the described configuration, the trajectory is situated at least approximately on the surface of a sphere whose center constitutes the isocenter of the C-arm system.

When the trajectory is suitably chosen, a spherical volume can be imaged as the examination zone. The diameter of such a sphere is not very dependent on the choice of the trajectory, but much more on the dimensions of the detector and on some other geometrical parameters. In practice this diameter amounts to approximately 30 cm. Obviously, when the object to be examined is a human body, it will not fit in such a small sphere, which means that the cone beam projections are necessarily cut off and that the cone beam does not cover the entire body. The image of the examination zone, however, is unambiguously determined by all cone beam projections along the trajectory, that is, in as far as the projections are not cut off.

As a consequence of cut-off cone beam projections the image of the examination zone cannot always be unambiguously determined. This has a minor effect only inside the sphere. However, large variations may occur at the edge of the sphere. Such variations have a negative effect on the image quality, notably at the edge of the examination zone to be imaged. The reconstruction of cut-off cone beam projections will give rise to artefacts which degrade the image quality.

It is possible to switch over between different entrance field diameters in X-ray image intensifiers by changing the focusing voltage while maintaining the anode voltage. When the diameter of the entrance field is reduced, the resolution increases. On the other hand, as the resolution increases the examination zone that can be imaged is reduced, because the entrance field diameter is reduced. In other words, the negative effect which occurs when cone beam projections are cut off becomes more manifest as the resolution increases and the entrance field diameter is reduced accordingly.

SUMMARY

Therefore, it is an object of the invention to provide a method and an X-ray device which enable the negative effect of the cut-off X-ray cone beam projections on the image quality to be reduced.

This object can be achieved in accordance with the invention by means of a method of reconstructing images from cone beam projection data of an examination zone of an object to be examined, the cone beam projection data being acquired by means of an X-ray device which includes an X-ray source and an X-ray image intensifier. The X-ray source is guided along a trajectory around the examination zone in order to acquire the projection data. The method includes the steps of: acquiring first projection data from the examination zone (3) in a first mode of operation of the X-ray image intensifier (2) with a low resolution; acquiring second projection data from a sub-zone of the examination zone in a second mode of operation of the X-ray image intensifier with a high resolution; combining the first and second projection data so as to form third projection data, the third projection data representing the second projection data in the sub-zone of the examination zone and the first projection data in the remaining part (3a) of the examination zone; and reconstructing images on the basis of the third projection data.

The above method can be carried out in accordance with the invention using an X-ray device which includes an X-ray source and an X-ray image intensifier for the acquisition of cone beam projection data from an examination zone of an object to be examined, the X-ray source being guided along a trajectory around the examination zone for the acquisition of the projection data, first projection data being acquired from the examination zone in a first mode of operation of the X-ray image intensifier with a low resolution while second projection data are acquired from a sub-zone of the examination zone in a second mode of operation of the X-ray image intensifier with a high resolution, and also includes means for combining the first and second projection data so as to form third projection data, the third projection data representing the second projection data in the sub-zone of the examination zone and the first projection data in the remaining part of the examination zone, and also includes an image processing device for the reconstruction of images on the basis of the third projection data.

The invention is based on the idea to acquire cone beam projection data of an examination zone of an object to be examined by means of an X-ray device which includes an X-ray source and an X-ray image intensifier, the X-ray source being guided along a trajectory around the examination zone in order to acquire the projection data. The X-ray image intensifier is first operative in a first mode which involves a low resolution. In this first mode of operation first projection data is acquired from the examination zone. Subsequently, the X-ray image intensifier is operative in a second mode of operation with a high resolution. In this second mode of operation second projection data is acquired from a sub-zone of the examination zone. Subsequently, the first and second projection data is combined so as to form third projection data. The third projection data is composed of the second projection data for the sub-zone of the examination zone as well as the first projection data for the remainder of the examination zone, that is, the difference zone between the examination zone and the sub-zone. Subsequently, the images are reconstructed on the basis of the third projection data.

This notably offers the advantage that the cone beam projections of the sub-zone are acquired with a high resolution, so that small details of the sub-zone are also visualized. The effect of the cut-off cone beam projections, notably at the edge of the sub-zone, is reduced, because in these locations recourse can be taken to the first projection data. In the first mode of operation of the X-ray image intensifier the occurrence of cut-off cone beam projections is far less in comparison with the second mode of operation, because in the first mode of operation essentially the entire examination zone is covered. The cone beam projections notably are not cut off around the sub-zone in the first mode of operation. Undesirable artefacts, notably in and around the sub-zone, can thus be avoided in the reconstruction.

In a version of the invention the number of first projection data, acquired in the first mode of operation, can be increased by 2D interpolation. This is advantageous because an increased number of first projection data results in an enhanced image quality of the reconstructed images, notably in the difference zone.

In a preferred version of the invention the sub-zone is masked by a diaphragm during the acquisition of the first projection data in the first mode of operation so that the X-ray dose is reduced. With a view to the fact that the second sub-zone is covered in a first as well as in a second mode of operation, it is thus achieved that the sub-zone is exposed to the X-rays only once, so that the overall X-ray dose is reduced.

In a further preferred version of the invention, the diaphragm is continuously readjusted during the acquisition of the first projection data in cases where the sub-zone is not centrally situated in the examination zone. The desired shielding of the sub-zone is thus ensured also when the sub-zone is shifted, relative to the X-ray source and the X-ray image intensifier, during the acquisition of the first projection data, while the X-ray source is guided along the trajectory around the examination zone for the acquisition of the projection data.

The invention also relates to an X-ray device as disclosed in claim 5 which may be configured and further elaborated in the same or similar way as the method described above and which may have corresponding advantageous embodiments.

DRAWINGS

The invention will be described in detail hereinafter with reference to the drawing. Therein:

DESCRIPTION

Figure 1:
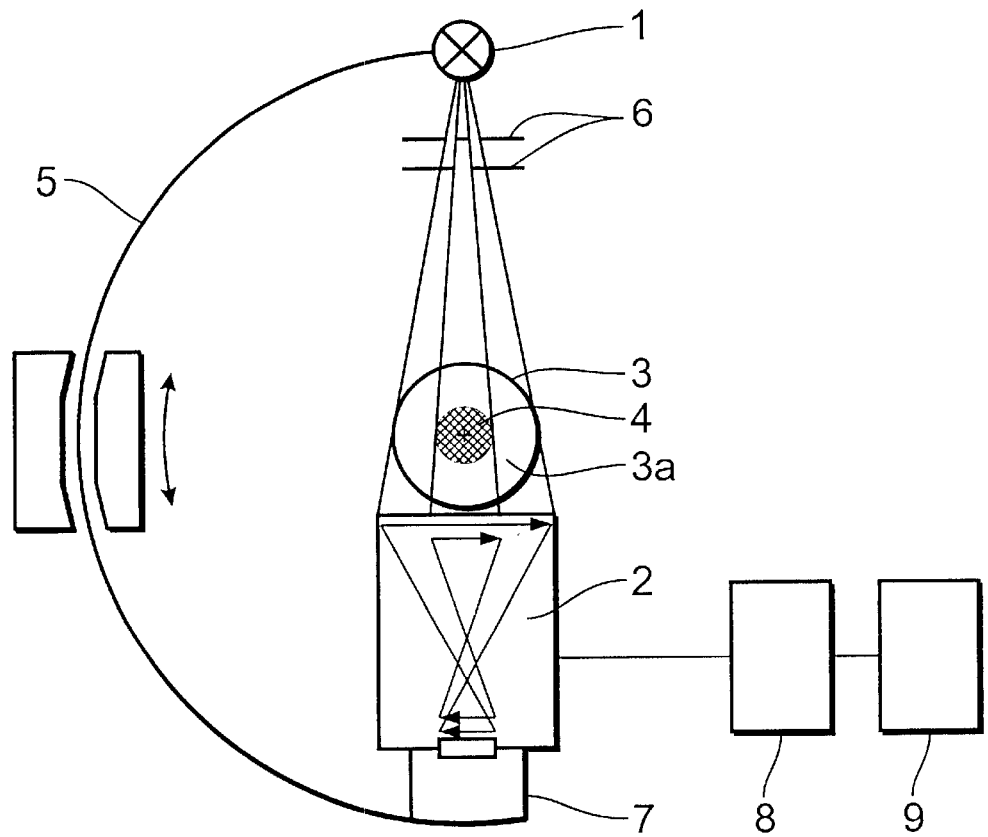
FIG. 1 is a diagrammatic representation of an X-ray device.

FIG. 1 is a diagrammatic representation of a C-arm X-ray device 5. The X-ray device includes an X-ray source 1, an X-ray image intensifier 2 and a television camera 7. A diaphragm 6 is arranged in front of the X-ray source 1. Between the X-ray source 1 and the X-ray image intensifier 2 there is situated the examination zone 3 of an object to be examined, for example, a patient. A sub-zone 4 is defined within the examination zone 3. The X-ray source 1 and the X-ray image intensifier 2 are attached to respective ends of the C-arm of the C-arm system 5.

The X-ray source 1 is guided along a trajectory around the examination zone 3 in order to acquire cone beam projection data from an examination zone. It is possible to switch over to different entrance field diameters, and hence different modes of operation (formats), of the X-ray image intensifier by changing the focusing voltages of the X-ray image intensifier 2 while maintaining the anode voltage. The resolution increases as the entrance field diameter becomes smaller.

Figure 2A:
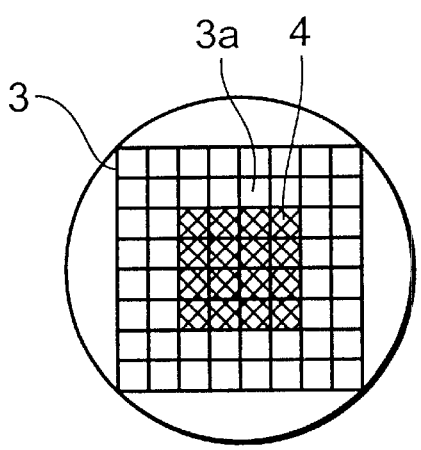
FIGS. 2a–2c shows projections of the first, the second and the third projection data.
Figure 2B:
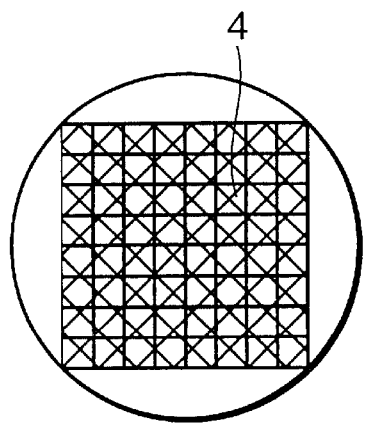
Figure 2C:
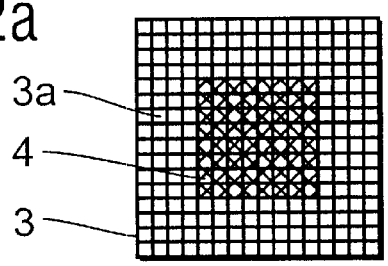

FIG. 2 shows the projections acquired with a low resolution in the first mode of operation (FIG. 2a), the projections acquired with a high resolution in the second mode of operation (FIG. 2b), as well as a combination of this data (FIG. 2c).

FIG. 2c illustrates diagrammatically how the first and second projection data is combined so as to form third projection data. In the sub-zone 4 the third projection data correspond to the second projection data of the sub-zone 4. In the remaining part 3a of the examination zone 3 the third projection data represent the first projection data of the examination zone 3.

As is shown in FIG. 2a, first a first set of cone beam projection data is acquired from the examination zone 3 in a first mode of operation with a maximum entrance field diameter, for example, 38 cm and hence a low resolution. In this first mode of operation the examination zone 3 is projected essentially completely onto the image intensifier, so that in the case of, for example, the head practically no cut-off cone beam projections occur.

As is shown in FIG. 2b, in a second run a second set of cone beam projection data is acquired from the sub-zone 4 in a second mode of operation of the X-ray image intensifier 2. In the second mode of operation the entrance field diameter of the image intensifier is smaller (for example, 17 cm) than in the first mode of operation. Because of the smaller entrance field diameter, a higher resolution is achieved for the X-ray image intensifier 2. On the other hand, however, the smaller entrance field diameter also is the reason why the examination zone 3 can no longer be projected completely, so that cut-off cone beam projections occur. Therefore, in this second run only a sub-zone 4 of the examination zone 4 is covered. This sub-zone 4 is chosen to be such that it represents the region of interest or the part of the examination zone 3 to be examined, because for this part to be examined it is often necessary to reproduce the details of the examination zone 3 with a high resolution. Details, for example, the structure of fine bones in a skull, can be recognized only in the case of a high resolution. The image intensifier 2, therefore, is adjusted to the second mode of operation and a second set of cone beam projection data is acquired from the second sub-zone 4.

Thus, two different runs are carried out so as to acquire projection data with different geometrical settings.

After the acquisition of the first and the second set of cone beam projection data, the first set of cone beam projection data from the examination zone 3 (FIG. 2a) and the second set of cone beam projection data from the sub-zone 4 (FIG. 2b) are combined so as to form a third set of cone beam projection data (FIG. 2c). The third set of cone beam projection data is formed essentially from the first set of cone beam projection data. However, the first projection data for the sub-zone 4 is then replaced by the second projection data for the sub-zone 4. It is to be noted that first projection data is also available for the sub-zone 4, because the sub-zone 4 is included in the examination zone 3, whereas second projection data is available only for the second sub-zone 4, but not for the entire examination zone 3. In as far as second projection data is available, therefore, it is given preference over the first projection data so as to replace the first projection data. As a result, third projection data is obtained which reproduces the sub-zone 4 with a high resolution and the remaining zone 3a of the examination zone 3 (that part of the examination zone which is not taken in by the sub-zone 4) with a low resolution. Suitable means (image processing device) 8 are also provided for the formation of the third projection data in the X-ray device shown in FIG. 1.

The reconstruction of images is then carried out on the basis of the third projection data and while using a reconstruction computer 9. The reconstruction can be performed, for example, by applying an algorithm to the filtered backprojection. If the trajectory was circular during the acquisition, the Feldkamp algorithm can also be used for the reconstruction.

The first set of projection data in a first mode of operation can also be acquired with a reduced spatial scanning rate, because the image quality of the difference zone 3a is of secondary importance for as long as the image quality of the sub-zone 4 suffices.

Alternatively, the number of first projection data obtained in the first mode of operation can be increased by 2D interpolation so as to enhance, if necessary, the image quality in the difference zone 3a after the reconstruction.

During the rotary motion in the first as well as in the second mode of operation of the X-ray image intensifier, projection images can be acquired normally at 1–2° or at a reduced angular scanning rate (for example, 4°) so as to reduce the X-ray dose for the examination zone.

In order to reduce the X-ray dose, the sub-zone 4 can be masked by means of the diaphragm 6 (constructed as a ring diaphragm) during data acquisition in the first mode of operation, that is, with a low resolution. This is because the first projection data of the sub-zone 4 is not necessary any way since this data is replaced by the second projection data of the sub-zone 4.

When the sub-zone 4 is centrally situated in the examination zone 3, the described acquisition of the cone beam projection data can take place. However, if the sub-zone 4 is not centrally situated in the examination zone 3, the diaphragm must be continuously readjusted during the rotary motion in the first mode of operation in order to ensure that the sub-zone 4 always remains exactly masked.

When angiography is to be performed, the contrast medium need not be used during the first rotary motion in the mode of operation with a low resolution. A contrast medium need be used only during the second rotary motion in the second mode of operation.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of reconstructing images from cone beam projection data of an examination zone of an object to be examined, the cone beam projection data being acquired by means of an X-ray device which includes an X-ray source and an X-ray image intensifier, said X-ray source being guided along a trajectory around the examination zone in order to acquire the projection data, which method includes the steps of:

acquiring first projection data from the examination zone in a first mode of operation of the X-ray image intensifier with a low resolution, acquiring second projection data from a sub-zone of the examination zone in a second mode of operation of the X-ray image intensifier with a high resolution, combining the first and second projection data so as to form third projection data, the third projection data representing the second projection data in the sub-zone of the examination zone and the first projection data in the remaining part of the examination zone, and reconstructing images on the basis of the third projection data.

2. A method as claimed in claim 1, in which the number of first projection data acquired from the examination zone in the first mode of operation is increased by 2D interpolation.

3. A method as claimed in claim 1, in which the sub-zone is masked by a diaphragm during the acquisition of the first projection data in the first mode of operation so that the X-ray dose is reduced.

4. A method as claimed in claim 3, in which the diaphragm is continuously readjusted during the acquisition of the first projection data if the sub-zone is not centrally situated in the examination zone.

5. An X-ray device comprising:

an X-ray source for projecting X-rays through an examination region;

an X-ray image intensifier for the acquisition of cone beam projection data from an examination zone of an object to be examined, the X-ray source being guided along a trajectory around the examination zone for the acquisition of the projection data, first projection data being acquired from the examination zone in a first mode of operation of the X-ray image intensifier with a low resolution while second projection data are acquired from a sub-zone of the examination zone in a second mode of operation of the X-ray image intensifier with a high resolution, and also includes means for combining the first and second projection data so as to form third projection data, the third projection data representing the second projection data in the sub-zone of the examination zone and the first projection data in the remaining part of the examination zone; and an image processing device for the reconstruction of images on the basis of the third projection data.

* * * * *